United States Patent [19]
Ogawa

[11] Patent Number: 5,841,995
[45] Date of Patent: Nov. 24, 1998

[54] DATA BUS CONTROLLER HAVING A LEVEL SETTING CIRCUIT

[75] Inventor: Hitoshi Ogawa, Kasugai, Japan

[73] Assignees: Fujitsu Limited, Kawasaki; Fujitsu VLSI Limited, Kasugai, both of Japan

[21] Appl. No.: 730,460

[22] Filed: Oct. 15, 1996

Related U.S. Application Data

[63] Continuation of Ser. No. 261,973, Jun. 17, 1994, abandoned.

[30] Foreign Application Priority Data

Jul. 20, 1993 [JP] Japan .................. 5-179396

[51] Int. Cl.$^6$ .................................................. H03K 17/16
[52] U.S. Cl. .......................... 395/309; 395/307; 326/30
[58] Field of Search .................... 395/309, 310, 395/311, 851, 307; 370/296; 326/30

[56] References Cited

U.S. PATENT DOCUMENTS

| | | | |
|---|---|---|---|
| 4,450,370 | 5/1984 | Davis ...................... | 307/475 |
| 4,451,891 | 5/1984 | Baba ....................... | 395/311 |
| 4,748,426 | 5/1988 | Stewart .................... | 333/22 |
| 4,788,693 | 11/1988 | Bays et al. ................ | 375/38 |
| 4,866,309 | 9/1989 | Bonke et al. ............... | 307/475 |
| 5,120,909 | 6/1992 | Kutz et al. ................ | 178/63 R |
| 5,313,595 | 5/1994 | Lewis et al. ............... | 395/325 |
| 5,381,034 | 1/1995 | Thrower et al. ............. | 257/529 |
| 5,382,841 | 1/1995 | Feldbaumer ................. | 326/30 |
| 5,422,580 | 6/1995 | Mandel et al. .............. | 326/30 |
| 5,434,516 | 7/1995 | Kosco ...................... | 326/30 |

FOREIGN PATENT DOCUMENTS

| | | |
|---|---|---|
| 0 187 293 A3 | 7/1986 | European Pat. Off. . |
| 0 403 117 A1 | 12/1990 | European Pat. Off. . |

OTHER PUBLICATIONS

Intel Peripherals 1990 pp. 3–100–3–123.
Patent Abstracts of Japan, vol. 17, No. 147 (P–1508), Mar. 24, 1993, & JP–A–04 318 612, Nov. 10, 1992.

*Primary Examiner*—Meng-Ai T. An
*Assistant Examiner*—Paul R. Myers
*Attorney, Agent, or Firm*—Nikaido, Marmelstein, Murray & Oram LLP

[57] ABSTRACT

A small computer system interface device is capable of transmitting data between a central digital data processing device and an external device without the need for terminal resistors coupled between the SCSI and the central digital data processing device. A pair of data buses each containing equal number of data lines supply data to a protocol controller which identifies the number of data lines being used to transfer data and then transfers the supplied data to a disk drive unit using the full number of data lines provided by said pair of buses. When the number of bus lines used is less than that provided by both buses, the protocol controller signals a level setting circuit to set the number of bus lines unused by to transfer data from the central digital processing device inactive so as to allow the throughput of data between the digital processing device, SCSI and disk drive unit.

8 Claims, 5 Drawing Sheets

DATA BUS CONTROLLER HAVING A LEVEL SETTING CIRCUIT

This application is a continuation of application Ser. No. 08/261,973 filed Jun. 17, 1994, now abandoned.

BACKGROUND OF THE INVENTION

1. Field of the Invention

The present invention relates to a level setting circuit applied to an interface device, such as a small computer system interface, which controls data transfer. More particularly, this invention relates to a semiconductor interface device which can keep the voltage level of extra bus lines at an inactive level when the width of a bus, i.e., the number of bus lines, differs from the bus width of an apparatus that is to be connected to this semiconductor interface device.

2. Description of the Related Art

In order to process digital information, as for example with microprocessors, data must be transferred between or among various type of information processing apparatuses. This is most commonly done by connecting these apparatuses with a bus cable. Many times however, the apparatuses, among or between which data is transferred, have varying bus widths. When this occurs, the apparatus having the larger number of bus lines in effect has bus lines unused by the apparatuses having smaller numbers of bus lines. If those unconnected bus lines are left in a floating state where no H-level or L-level signal is input, that semiconductor device cannot adequately receive a predetermined number of bits of data necessary for its operation. In these cases terminal resistors are commonly used to set the voltage level of any unconnected bus lines to that of an inactive state. In this way, a predetermined number of bits of data are able to be input to the semiconductor device, so that this semiconductor device will properly function.

FIG. 1 shows a conventional information processing system. This system has a personal computer 10 and a SCSI (Small Computer System Interface) unit 20 that can be used for example with an optical disk drive. Both the personal computer 10 and the SCSI unit 20 are connected by a SCSI bus cable 16.

The computer 10 includes a controller 11, a bus driver/receiver 12 and a bus 13. The bus 13 includes eight bus lines. The bus 13 is provided with a pair of connectors 14 and 15. The bus driver/receiver 12 is connected to the bus 13 and to the controller 11. The controller 11 operates to receive 8-bit parallel data from the bus 13 via the bus driver/receiver 12, and executes predetermined processing based on the received data. The controller 11 also outputs 8-bit parallel data onto the bus 13 via the bus driver/receiver 12.

The SCSI unit 20 includes a controller 21, a bus driver/receiver 22 and a main bus 23. The main bus 23 has first and second sub-buses 24 and 25 each including eight bus lines. Thus, the bus 23 has a total of sixteen bus lines.

The first sub-bus 24 is provided with connectors 26 and 27. The second sub-bus 25 includes connectors 28 and 29. The controller 21 communicates with the main bus 23 via a bus driver/receiver 22. More specifically, the controller 21 receives 16-bit parallel data from the main bus 23 via the bus driver/receiver 22, and performs predetermined processing based on the received data. The controller 21 also outputs 16-bit parallel data onto the main bus 23 via the bus driver/receiver 22.

The connector 15 and the connector 26 use the bus cable 16 to transfer data between the computer 10 and the SCSI unit 20. To execute data transfer via the cable 16, the active level and inactive level of the buses 13 and 23 are respectively defined as an L level and an H level. A terminal resistor 17 is connected to each of the connectors 14 and 27 to set the bus lines 13 and 24 to an inactive level or an H level.

FIG. 2 shows a terminal resistor for one bus line DBL. The terminal resistor 17 of FIG. 1 would have terminal resistors 17a equal in number to that of the bus lines. Each terminal resistor 17a includes resistors R1 and R2 connected in series between a power source Vcc and ground GND. The bus line DBL is connected between the resistors R1 and R2.

When the SCSI unit 20 receives parallel data from the computer 10, the second sub-bus 25 floats unless an H-level or L-level signal is input to the second sub-bus 25. In this floating state, 16-bit parallel data is not adequately input to the controller 21, causing the controller 21 to malfunction. To prevent such a malfunction, the terminal resistors 17 of the same type as described above are respectively connected to the connectors 28 and 29 to set the bus 25 to an inactive level. Accordingly, the controller 21 can receive 16-bit parallel data adequately and can function properly.

However, the terminal resistors connected to the bus lines in the SCSI unit 20 are, according to the present invention, unnecessary for actual data transfer. Naturally, incorporating such terminal resistors into the SCSI unit 20 contribute to the increased size and weight of the SCSI unit. Eliminating the need for these resistors therefore would allow for reductions to be made to the size and weight of the SCSI unit 20.

SUMMARY OF THE INVENTION

It is therefore an object of the present invention to provide a compact and light semiconductor device which can eliminate the need for unnecessary terminal resistors while preventing bus lines unnecessary for actual data transfer from floating.

To achieve the above object, according to this invention, there is provided a level setting circuit capable of setting a plurality of terminals at a predetermined voltage level, each terminal being arranged to be connected with a data line, said circuit being activated to set at least one of the terminals at said predetermined voltage level when the terminal is free from the connection with the data line.

In accordance with one aspect of this invention, there is provided an interface device to control the transfer of digital data between a first data processing device and a second data processing device according to the number of data lines provided at the output of the first data processing device. This interface device includes an upper and a lower data buses, each having equal numbers of data bit lines which are connectable to said first data processing device, and a protocol controller responsive to data provided by said upper and lower buses.

This protocol controller detects the number of bus lines used at the output of said first data processing device, and represents the detected number to the disk drive controller as the combined number of data lines provided by the upper and lower data busses. The protocol controller moreover, provides a first signal indicative of the number of data lines used by said first data processing device. A level setting circuit is provided which couples between the protocol controller and the upper and lower buses. The level setting circuit is responsive to the first signal for setting the voltage level of one of said upper and lower buses inactive when the number of data lines used by said central data processing device is less than that provided by both upper and lower data buses. In this way the number of data lines used to transfer data between said interface device and first data processing device is the same as the number of data lines provided at the output of the central data processing device.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A preferred embodiment of the present invention will now be described referring to FIGS. 3 through 6.

Figure 3:
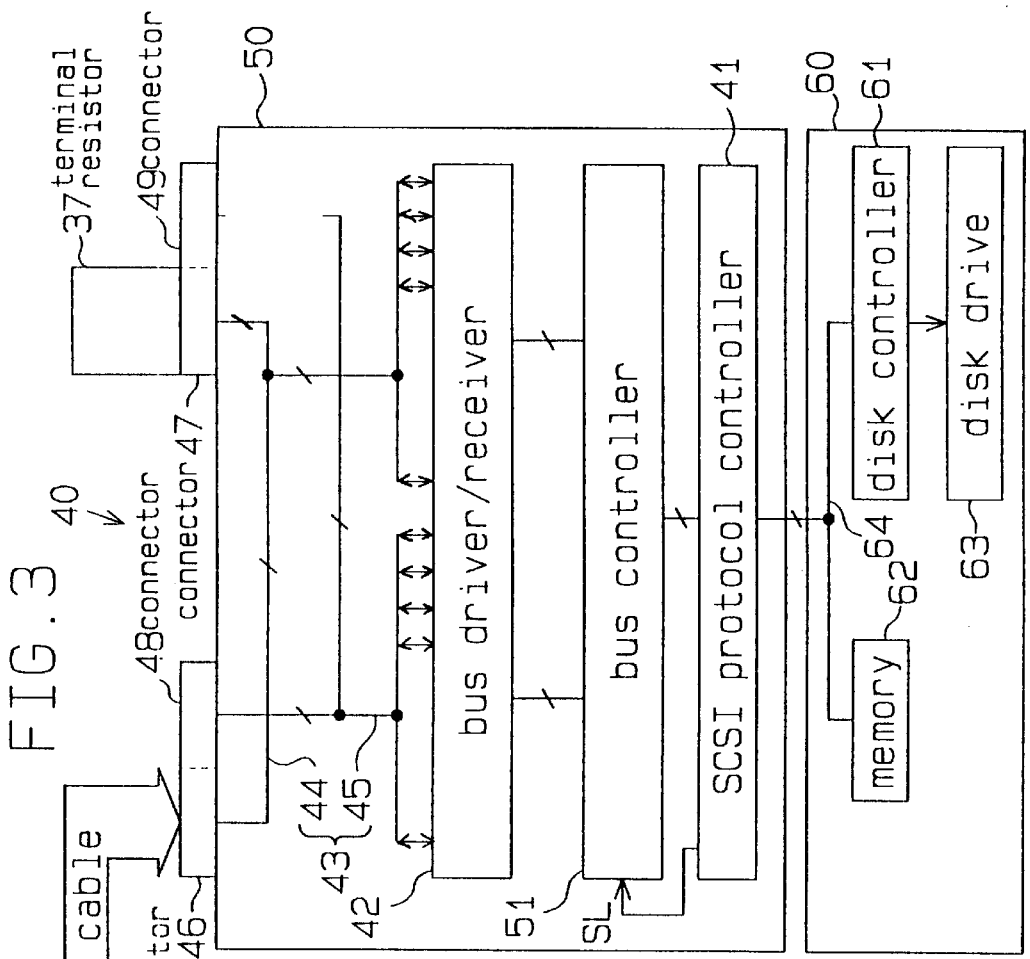
FIG. 3 is a block diagram illustrating an information processing system according to one embodiment of the present invention.

FIG. 3 illustrates an information processing system according to this embodiment. This system includes a personal computer 30, for example as a central digital processing device and an optical disk system 40 connected together by a SCSI bus cable 36. Data is transferred between the personal computer 30 and the optical disk system 40 according to the SCSI protocol controller 41.

Figure 4:
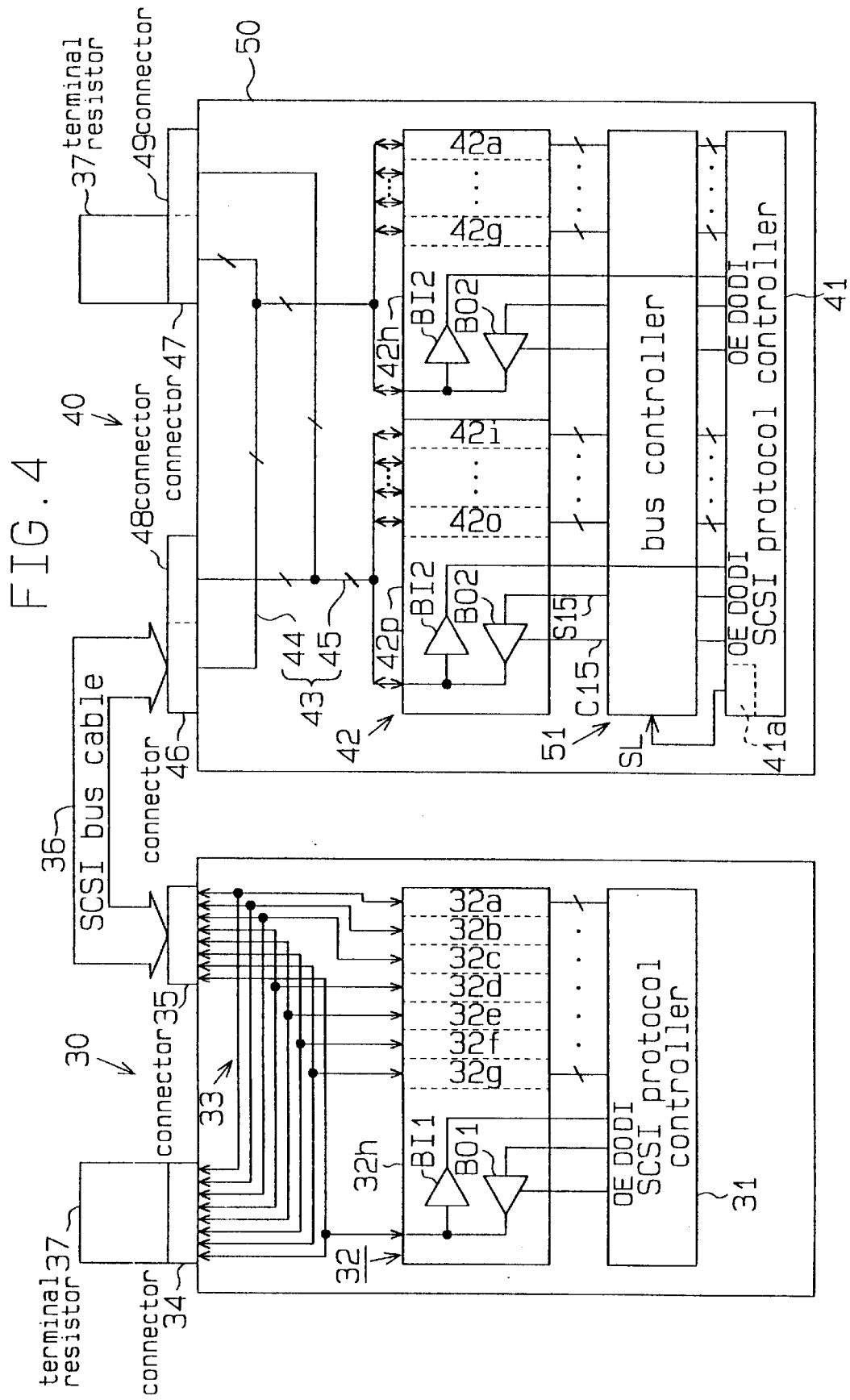
FIG. 4 is a block diagram showing a personal computer and a SCSI unit in FIG. 3.

This is further shown in FIG. 4 with the computer 30, a SCSI protocol controller 31, a bus driver/receiver 32 and a bus 33. The bus 33 is shown for example as having eight bus lines, and is provided with a pair of connectors 34 and 35. The bus driver/receiver 32 comprises tristate buffers 32a to 32h connected to the respective bus lines of the bus 33. Each of the buffers 32a–32h has an input buffer BI1 and an output buffer BO1. The output buffer BO1 receives a data signal DO and an output enable signal OE. The output buffer BO1 provides an input signal on the associated bus line when the enable signal OE is high, and discontinues providing the output of signal OE when the enable signal OE is low.

The controller 31 is connected to the bus driver/receiver 32. The controller 31 receives 8-bit parallel data DBO (least significant bit) to DB7 (most significant bit) via the input buffers BI1 of the buffers 32a–32h, and executes predetermined processing based on that data. The controller 31 outputs 8-bit parallel data to the individual output buffers BO1 of the buffers 32a–32h while outputting the output enable signal OE to those output buffers. As a result, the 8-bit parallel data is output onto the bus 33 via the bus driver/receiver 32.

As shown in FIG. 3, the optical disk system 40 includes a SCSI unit 50 and a disk unit 60. The disk unit 60 has a disk controller 61, a memory 62 and a disk drive 63. The controller 61 is connected to the memory 62 and the SCSI unit 50 via a bus 64. This allows the controller 61 to execute data transfer between the memory 62 and the SCSI unit 50 via the bus 64. The controller 61 controls the disk drive 63 to store data, read from a disk, into the memory 62 and to write data in the memory 62 on the disk. The controller 61 controls data writing and data reading.

As shown in FIG. 4, the SCSI unit 50 has a SCSI protocol controller 41, a bus driver/receiver 42, a bus controller 51 and a main bus 43. The main bus 43 has lower and upper data buses 44 and 45, each of which have eight bus lines. The main bus 43 therefore has a total of sixteen bus lines. The lower data bus 44 is provided with a pair of connectors 46 and 47, and the upper data bus 45 with a pair of connectors 48 and 49.

The bus driver/receiver 42 comprises sixteen tristate buffers 42a to 42p. Of the sixteen buffers, the eight buffers 42a to 42h are connected to the respective bus lines of the lower data bus 44. The remaining eight buffers 42i to 42p are connected to the respective bus lines of the upper data bus 45.

Each of the buffers 42a–42p comprise an input buffer BI2 and an output buffer BO2. The input buffer BI2 directly provides an input signal to the controller 41. The output buffer BO2 receives a data signal and an output enable signal OE. The output buffer BO2 provides the input signal to the associated bus line when the enable signal OE is high. When signal OE is low, the output buffer BO2 discontinues providing the input signal to the associated bus line.

The controller 41 is connected to the bus driver/receiver 42 via the bus controller 51, and to the disk unit 60 via the bus 64. The controller 41 controls the SCSI bus based on the SCSI protocol which allows data transfer between two information processing apparatuses. There are four general phases used in controlling SCSI buses: a bus free phase, arbitration phase, selection phase and information transfer phase. The bus free phase resets the voltage level of the SCSI bus using the terminal resistor 37. Next in the arbitration phase, permission to use the SCSI bus is obtained by the SCSI controller 31 in the computer 30. Following this, in the selection phase, the device that has been authorized to use the SCSI bus selects a target device to which data will be transferred. Finally, in the information transfer phase various kinds of information are transferred via the SCSI bus. The information transfer phase generally includes a command phase, a data phase, a status phase and a message phase.

In the data phase, the controller 41 receives 16-bit parallel data DB0 (least significant bit) to DB15 (most significant bit) from the input buffers BI2 via the bus controller 51. The controller 41 transfers the input data via the bus 64 to the disk unit 60. In the data phase, the controller 41 also receives 16-bit parallel data from the disk unit 60. The controller 41 outputs the input parallel data DB0–DB15 to the bus controller 51 while outputting output enable signals DBOE0 to DB0E15 (shown in FIG. 5) to the controller 51.

As shown in FIG. 4, the controller 41 has a register 41a. A select signal SL representing the number of bits of data to be transferred is previously set in the register 41a to reflect the number of data bits used by the personal computer 30 to which the disk drive 40 is connected.

More specifically, when a target device for data transfer is selected in the selection phase, the select signal SL is set to identify the number of data bits used by the target device, i.e., 8, 16 etc. The select signal SL may be set based on a response to an inquiry as to how many bits of data the optical device connected to the disk system 40 can handle and a response to this inquiry. In this embodiment, the select signal SL is set to a high voltage level if the computer 30 handles 8-bit parallel data, and is set to a low voltage level for an information processing apparatus that handles 16-bit parallel data. The register 41a outputs the select signal SL to the bus controller 51.

Figure 5:
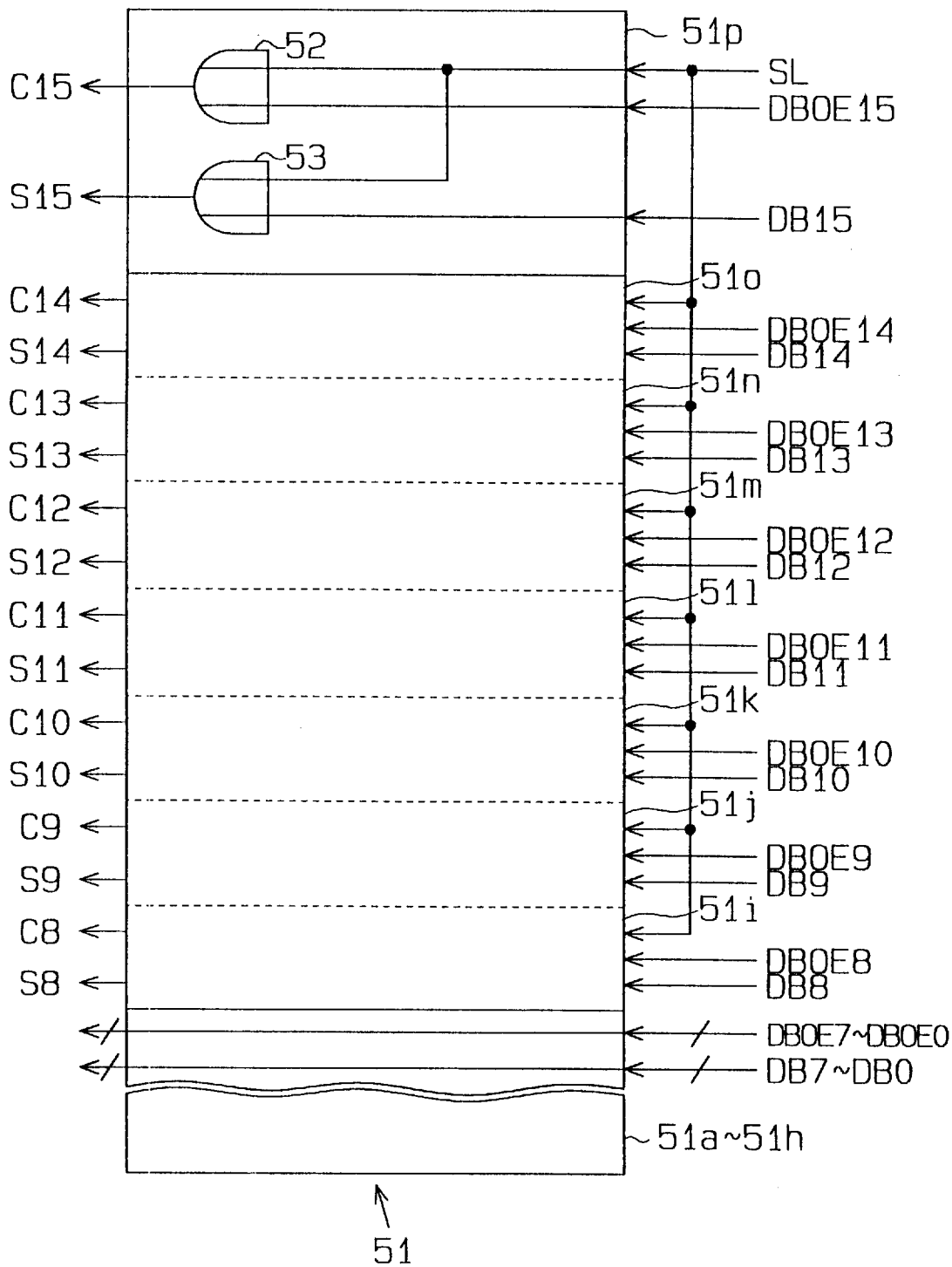
FIG. 5 is a circuit diagram showing a bus controller in FIG. 4.

As shown in FIG. 5, the bus controller 51 includes sixteen circuit sections 51a to 51p associated with the buffers 42a to 42p (shown in FIG. 4). Of the sixteen circuit sections, eight circuit sections 51a–51h are provided for the lower 8bits of the 16-bits of parallel data, i.e., DB0 to DB7. Sections 51a–51h control data transfer between the associated buffers 42a–42h and the controller 41. The remaining eight circuit sections 51i–51p are provided for the upper 8-bit data DB8 to DB15 of the 16-bit parallel data. Those circuit sections 51i–51p directly transfer the output of the associated buffers 42i–42p to the controller 41.

Each of the circuit sections 51i to 51p has OR gates 52 and 53. The OR gates 52 receive the aforementioned select signal SL and the enable signals DB0E8 to DB0E15, respectively. Based on the select signal SL and the enable signals DBOE8–DBOE15, the OR gates 52 respectively produce control signals C8 to C15. The OR gates 52 output the control signals C8–C15 to the output buffers BO2 of the buffers 42i–42p, respectively.

The OR gates 53 receive the aforementioned select signal SL and the upper 8-bit data DB8 to DB15. The OR gates 53 respectively produce signals S8 to S15 based on both the eight bit data and the select signal SL. The OR gates 53 then output the signals S8–S15 as data signals to the individual output buffers BO2 of the buffers 42i–42p.

When the select signal SL is at an L level, therefore, the OR gates 52 respectively outputs the enable signals DBOE8–DBOE15 as the enable signals C8–C15 while the OR gates 53 respectively output the data DB8–DB15 as the signals S8–S15. Alternatively, when the select signal SL is high, the OR gates 52 respectively output the H-level control signals C8–C15 regardless of the levels of the enable signals DBOE8–DBOE15. The OR gates 53 respectively output high level signals S8–S15 regardless of the levels of the data DB8–DB15.

The connector 35 of the computer 30 and the connector 46 of the SCSI unit 50 are connected by the bus cable 36. This allows data to be transferred between the computer 30 and SCSI unit 50. Another computer as a peripheral data processing device can be connected to the connector 47 in place of the terminal resistor 37 via a cable. This also allows data to be transferred between the computer and the SCSI unit 50.

To execute data transfer via the cable 36, the optical active level and inactive level of the buses 33 and 43 are respectively defined as an L level and an H level. Instead of using a SCSI bus coupled between the connector 34 of the computer 30 and the connector 47 of the optical disk system 40, a terminal resistor 37 is connected to each of the connectors 34 and 47 to set the bus lines 33 and 44 to an inactive level or an H level.

Figure 1:
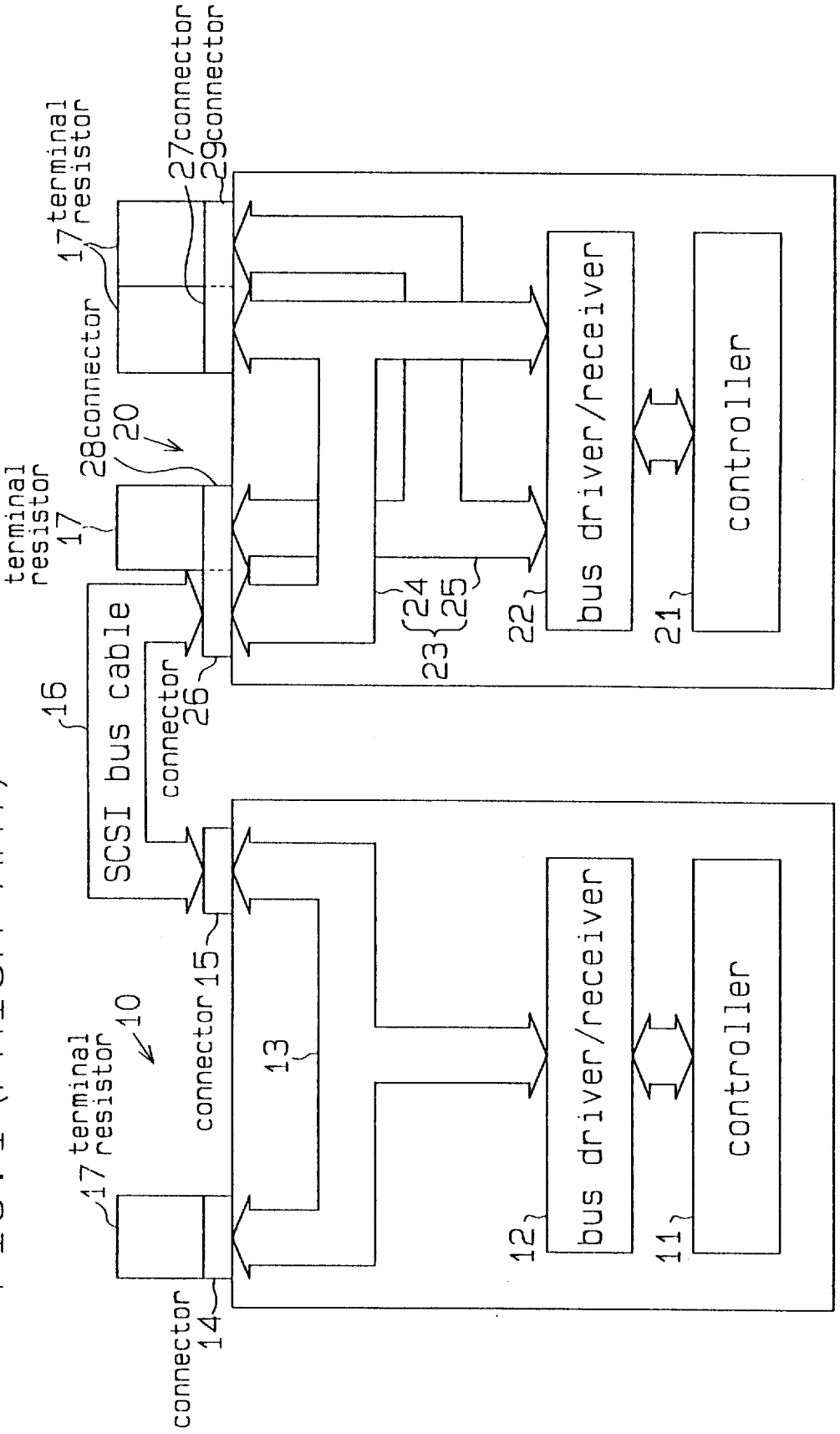
FIG. 1 is a block diagram illustrating a conventional information processing system.
Figure 2:
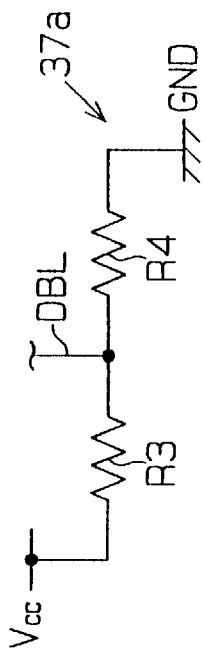
FIG. 2 is a circuit diagram showing a terminal resistor for one bus line in a bus shown in FIG. 1.
Figure 6:
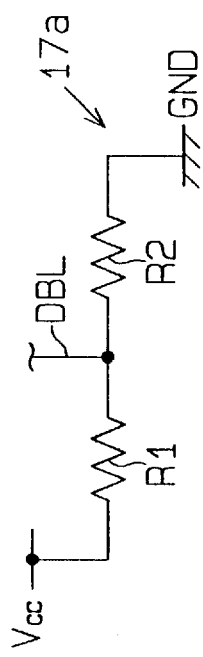
FIG. 6 is a circuit diagram showing a terminal resistor for one bus line in a bus shown in FIG. 4.

FIG. 6 shows a terminal resistor 37a for one bus line DBL. The terminal resistor 37 shown in FIG. 4 has a number of terminal resistors 37a equal to that of the number of bus lines. Each terminal resistor 37a includes resistors R3 and R4 connected in series between a power source Vcc and ground GND. The bus line DBL is connected between the resistors R3 and R4.

In the above described information processing system, data is transferred between the optical disk system 40 and the personal computer 30 by using the SCSI protocol controller 41 to set register 41a high. This is done, for example when computer 30 is set to process 8-bit parallel data. Alternatively, register 41a can be manually set by a switch. When the SCSI unit 50 transfers data to the computer 30, therefore, the controller 41 outputs H-level output enable signals DBOEO to DBOE15 and sixteen pieces of bit data DBO to DB15. Based on the H-level select signal SL, the control signals C8 to C15 go high as do the signals S8 to S15 shown in FIG. 5.

Based on the enable signals DBOEO–DBOE7, the bit data DBO–DB7 is output to the lower data bus 44 via the output buffers BO2 of the buffers 42a–42h. Based on the control signals C8–C15, the output buffers BO2 of the buffers 42i–42p can output the received signals, so that the H-level signals S8–S15 are sent onto the upper data bus 45. In this way 8-bit data, for example, is properly transferred via the cable 36 from SCSI unit 50 to the controller 31 of the computer 30.

When the SCSI unit 50 receives the data from the computer 30, the output enable signals DBOEO–DBOE15 from the controller 41 go low. Based on these low level enable signals DBOEO–DBOE7, the buffers 42a–42h stop outputting the stored signals. When the control signals C8–C15 go high due to the H-level select signal SL, the signals S8–S15 shown in FIG. 5 go high. Based on the control signals C8–C15, the output buffers BO2 of the buffers 42i–42p can output the received signals, so that the H-level signals S8–S15 are sent onto the upper data bus 45. As a result, the upper data bus 45, which is not used for data transfer, goes high to an inactive level, and is thus prevented from floating. Since no terminal resistor is needed for the upper data bus 45, unlike in the prior art, the optical disk system 40 can be designed compact and lighter.

When the SCSI unit 50 receives 8-bit parallel data transferred via the cable 36 from the computer 30, the parallel data is input as the lower 8-bit data DBO–DB7 via the input buffers B12 of the buffers 42a–42h. The H-level signals on the upper data bus 45 are input as the upper 8-bit data DB8–DB15 via the input buffers B12 of the buffers 42i–42p. Therefore, the controller 41 can accurately receive 16-bit parallel data DBO–DB15 including the upper 8-bit data being set to zero and function correctly based on that received data.

In transferring data between the disk drive 40 and an information processing apparatus which can handle 16-bit parallel data, the end of a bus cable is simultaneously connected to the connectors 46 and 48. In this case, the select signal SL having an L level would be set in the register 41a. When the SCSI unit 50 transfers data to the information processing apparatus, the controller 41 would output high level output enable signals DBOE0 to DBOE15 and sixteen pieces of bit data DBO to DB15. Based on the enable signals DBOE8–DBOE15, the control signals C8 to C15 would go high and the data DB8–DB15 would be output as the signals S8–S15. Based on the enable signals DBOE0–DBOE7, the bit data DBO–DB7 would be output to the lower data bus 44 via the output buffers BO2 of the buffers 42a–42h. Based on the control signals C8–C15, the bit data DB8–DB15 would be output to the upper data bus 45 via the output buffers BO2 of the buffers 42i–42p. Accordingly, 16-bit data would be transferred from the SCSI unit 50 via the bus cable.

When the SCSI unit 50 receives the data from the information processing apparatus, the output enable signals DBOE0–DBOE15 from the controller 41 goes low. Based on these low level enable signals DBOE0–DBOE7, the buffers 42a–42h stop outputting the stored signals. Based on the enable signals DBOE8–DBOE15, the control signals C8–C15 of the bus controller 51 go low, and cause the buffers 42i–42p to stop the signal output. The lower and upper data buses 44 and 45 are then ready to receive signals. The 16-bit parallel data, sent to the SCSI unit 50, is input as the upper 8-bit data DB8–DB15 and the lower 8-bit data DB0–DB7 via the input buffers BI2 of the buffers 42a–42p. Therefore, the controller 41 can adequately receive 16-bit parallel data DB0–DB15 in total and will properly function based on the received data.

Although only one embodiment of the present invention has been described herein, it should be apparent to those skilled in the art that the present invention may be embodied in many other specific forms without departing from the spirit or scope of the invention. Particularly, it should be understood that the following modifications may be employed.

To hold the level of the bus, unused for data transfer, at an inactive level, the select signal SL may be input directly to the bus controller 51 from an external unit. Alternatively, the select signal SL may be produced based on unused signals on the SCSI bus cable 36.

The bus lines corresponding to the upper 8-bit data DB8–DB15 among 16-bit parallel data are held at an inactive level in the above-described embodiment. Alternatively, different select signals may be input to the sixteen circuit sections 51a–51p of the controller 51 to arbitrarily select the bus lines corresponding to the tristate buffers 42a–42p.

Although the controller 41 and the controller 51 are separately provided in the optical disk system 40 in this embodiment, the controller 51 may be incorporated in the controller 41.

While this embodiment of the present invention is adapted for the interface of a SCSI bus, it may also be adapted for the interface of a DMA (Direct Memory Access) bus.

Therefore, the present examples and embodiment are to be considered as illustrative and not restrictive, and the invention is not to be limited to the details given herein, but may be modified within the scope of the appended claims.

What is claimed is:

1. A level setting circuit for setting a terminal at a predetermined voltage level, said level setting circuit comprising:

a data line coupled to said terminal;

an input buffer coupled to said data line;

an output buffer coupled to said data line, said output buffer having a data input receiving an output buffer data input signal and an enable input receiving an output buffer enable signal, the output buffer enable signal for selectively enabling and disabling an output of said output buffer; and a controller including a first logical gate receiving a select signal and an enable signal and generating the output buffer enable signal and a second logical gate receiving the select signal and a data signal and generating the output buffer data input signal, wherein the voltage level at said terminal is clamped at the predetermined voltage level when the select signal is active.

2. A level setting circuit according to claim 1, wherein said first and second logical gates comprise OR gates.

3. A semiconductor interface device to control the transfer of digital data between a first data processing device and a data storage device according to the number of data lines provided at the output of said first data processing device, said semiconductor interface device comprising:

upper and lower data buses, each containing equal numbers of data lines, each of said data lines coupled to a respective terminal of a plurality of terminals and selectively connected to said first data processing device;

a protocol controller responsive to data provided by said upper and lower data buses, for detecting the number of data lines used at the output of said first data processing device, for representing said detected number of data lines to said data storage device as the combined number of data lines provided by said upper and lower data buses, and for providing a first signal indicative of the number of data lines used by said first data processing device; and a level setting circuit coupled between said protocol controller and said upper and lower data buses, said level setting circuit including a plurality of input buffers coupled to a respective one of said data lines of said upper and lower data buses; and a plurality of output buffers coupled to a respective one of said data lines of said upper and lower data buses, each of said output buffers having a data input receiving an output buffer data input signal and an enable input receiving an output buffer enable signal for selectively enabling and disabling an output of said output buffer; and a controller including a plurality of first logical gates receiving a select signal and an enable signal and generating the output buffer enable signal and a plurality of second logical gates each receiving the select signal and a data signal and generating a respective one of the plurality of output buffer data input signals, wherein the voltage level at each of said plurality of terminals is clamped at a predetermined voltage level when the select signal is active.

4. A semiconductor interface device according to claim 3, wherein eight data lines are provided in each of said upper and lower data buses.

5. A semiconductor interface device according to claim 3, wherein said first data processing device includes a personal computer.

6. A semiconductor interface device according to claim 3, wherein said data storage device includes a disk drive unit.

7. A Small Computer System Interface (SCSI) device to control a transfer of digital data between a data processing device and a disk drive unit according to the number of data lines provided at an output of said data processing device, said SCSI device comprising:

upper and lower data buses, each containing equal numbers of data lines, each of said data lines respectively coupled to each terminal of a plurality of terminals and connected to said data processing device;

a protocol controller responsive to data provided by said upper and lower data buses, for detecting the number of data lines used at the output of said data processing device, for representing said detected number of data lines to said disk drive unit as the combined number of data lines provided by said upper and lower data buses, and for providing a first signal indicative of the number of data lines used by said data processing device; and a level setting circuit coupled between said protocol controller and said upper and lower data buses, said level setting circuit including:

a plurality of input buffers coupled to a respective one of said data lines of said upper and lower data buses;

a plurality of output buffers coupled to a respective one of said data lines of said upper and lower data buses, each of said output buffers having a data input receiving an output buffer data input signal and an enable input receiving an output buffer enable signal for selectively enabling and disabling an output of said output buffer; and a controller including a plurality of first logical gates receiving a select signal and an enable signal and generating the output buffer enable signal and a plurality of second logical gates each receiving the select signal and a data signal and generating a respective one of the plurality of output buffer data input signals, wherein the voltage level at each of said plurality of terminals is clamped at a predetermined voltage level when the select signal is active.

8. A level setting circuit for setting a plurality of terminals at a predetermined voltage level, said level setting circuit comprising:

a plurality of data lines respectively coupled said plurality of terminals;

a plurality of input buffers respectively coupled to said plurality of data lines;

a plurality of output buffers respectively coupled to said plurality of data lines, each of said output buffers having a data input receiving an output buffer data input signal and an enable input receiving an output buffer enable signal, the output buffer enable signal for selectively enabling and disabling an output of said output buffer; and a controller including a plurality of first logical gates receiving a select signal and an enable signal and generating the respective output buffer enable signals and a plurality of second logical gates each receiving the select signal and a data signal and generating a respective one of the plurality of output buffer data input signals, wherein the voltage level at each of said plurality of terminals is clamped at the predetermined voltage level when the select signal is active.

* * * * *